(12) United States Patent
Song et al.

(10) Patent No.: US 11,628,879 B2
(45) Date of Patent: Apr. 18, 2023

(54) POWER TRANSMISSION DEVICE OF STEERING SYSTEM

(71) Applicant: HL MANDO CORPORATION, Pyeongtaek-si (KR)

(72) Inventors: Seok Ki Song, Anyang-si (KR); Heung Ju Kim, Yongin-si (KR); Jong Han Kim, Anyang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 813 days.

(21) Appl. No.: 16/545,040

(22) Filed: Aug. 20, 2019

(65) Prior Publication Data
US 2020/0055546 A1 Feb. 20, 2020

(30) Foreign Application Priority Data
Aug. 20, 2018 (KR) .................. 10-2018-0096982

(51) Int. Cl.
*B62D 7/22* (2006.01)
*F16F 9/00* (2006.01)
*B62D 5/04* (2006.01)

(52) U.S. Cl.
CPC ........... *B62D 7/228* (2013.01); *B62D 5/0472* (2013.01); *F16F 9/006* (2013.01)

(58) Field of Classification Search
CPC ........ B62D 7/228; B62D 5/0472; F16F 9/006
See application file for complete search history.

(56) References Cited

U.S. PATENT DOCUMENTS 2,004,299 A * 6/1935 Snyder .................. F16D 3/68
464/89
5,933,405 A * 8/1999 Song .................... G11B 7/0946
720/683

(Continued)

FOREIGN PATENT DOCUMENTS

CN 106662162 A 5/2017
CN 108284870 A 7/2018

(Continued)

OTHER PUBLICATIONS

Chinese Office Action dated Nov. 18, 2022, in connection with the Chinese Patent Application No. 201910763277.2, 15 pages.

(Continued)

*Primary Examiner* — Kevin Hurley
*Assistant Examiner* — Marlon A Arce
(74) *Attorney, Agent, or Firm* — Hauptman Ham, LLP

(57) ABSTRACT

A power transmission device of a steering system. A first connector includes a cylindrical first support coupled to one of coaxial first and second shafts and first coupling portions extending axially from inner circumferential portions of the first support. A second connector includes a second support coupled to the other of the first and second shafts and fitted into the first support and second coupling portions extending axially from outer circumferential portions of the second support. A damper includes outer support recesses provided in outer circumferential portions thereof, with the first coupling portions being fitted into the outer support recesses, and inner support recesses provided in inner circumferential portions thereof, with the second coupling portions being fitted into the inner support recesses, wherein the damper is coupled between the first connector and the second connector.

19 Claims, 10 Drawing Sheets

(56) References Cited

U.S. PATENT DOCUMENTS

| | | | | |
|---|---|---|---|---|
| 6,176,529 | B1* | 1/2001 | Kitzmiller | B60R 19/56 |
| | | | | 293/134 |
| 6,957,825 | B2* | 10/2005 | Peters | B60D 1/07 |
| | | | | 280/483 |
| 7,753,391 | B1* | 7/2010 | Hesse | B62D 53/061 |
| | | | | 280/439 |
| 8,505,675 | B2* | 8/2013 | Suzuki | B62D 5/0409 |
| | | | | 180/444 |
| 11,214,307 | B2* | 1/2022 | Kwon | F16H 55/24 |
| 2017/0015380 | A1* | 1/2017 | Stothers | B62D 7/228 |
| 2017/0058991 | A1* | 3/2017 | Kim | F16F 1/377 |
| 2017/0114837 | A1 | 4/2017 | Yamaguchi et al. | |
| 2018/0194387 | A1 | 7/2018 | Kwon | |

FOREIGN PATENT DOCUMENTS

| | | |
|---|---|---|
| JP | 2013-177955 A | 9/2013 |
| KR | 10-2017-0027176 A | 3/2017 |

OTHER PUBLICATIONS

Korean Office Action dated Feb. 22, 2023 for corresponding Korean Patent Application No. 10-2018-0096982, 14 pages.

* cited by examiner

POWER TRANSMISSION DEVICE OF STEERING SYSTEM

CROSS REFERENCE TO RELATED APPLICATION

This application claims priority from Korean Patent Application No. 10-2018-0096982, filed on Aug. 20, 2018, which is hereby incorporated by reference for all purposes as if fully set forth herein.

BACKGROUND

Field

Embodiments relate to a power transmission device of a steering system. More particularly, embodiments relate to a power transmission device of a steering system, the power transmission device being able to transmit torque from a first shaft to a second shaft while reliably maintaining strength without vibrations or noise and to absorb noise due to heat or impacts, as compared to power transmission devices of the related art.

Description of Related Art

A steering system of a vehicle is an apparatus allowing a driver to freely change the direction in which the vehicle is traveling by turning a steering wheel. The steering system serves to change the center of rotation of the front wheels of the vehicle, thereby helping the driver to steer the vehicle in a direction in which he or she wishes to travel. The steering system may be implemented as an electric power-assisted steering system including an assistance power mechanism in order to lessen the amount of force that the driver must exert to change the orientation of the front wheels.

The electric power-assisted steering system is configured to detect the rotation of the steering wheel and to drive a motor disposed on a rack or a steering shaft to assist the rotation of the front wheels, so that the steering system can operate efficiently.

However, in such electric power-assisted steering systems of the related art, a power transmission device is configured such that an inner rotor and an outer rotor are simply fitted to each other when engaged with each other, such that an inner portion of the inner rotor and an inner portion of the outer rotor are in direct contact with each other. When a vehicle has been used for a certain period of time, or is traveling on a specific road, such as gravel road, a large amount of impacts may be inversely input along a steering shaft, thereby causing wear in play portions of the inner rotor and the outer rotor due to contact and generating noise.

In addition, a process of engaging the inner rotor and the outer rotor with each other and a process of applying grease to a space between the inner rotor and the outer rotor may be required, thereby increasing steps required in an assembly process and fabrication costs, which are problematic.

BRIEF SUMMARY

Various aspects provide a power transmission device of a steering system, the power transmission device being able to transmit torque from a first shaft to a second shaft while reliably maintaining strength without vibrations or noise, as compared to power transmission devices of the related art, and to absorb noise due to heat or impacts.

The object of the present disclosure is not limited to the aforementioned description, and other objects not explicitly disclosed herein will be clearly understood by those having ordinary knowledge in the technical field, to which the present disclosure pertains, from the description provided hereinafter.

According to an aspect, a power transmission device of a steering system may include: a first connector including a cylindrical first support coupled to one of coaxial first and second shafts and first coupling portions extending axially from inner circumferential portions of the first support; a second connector including a second support coupled to the other of the first and second shafts and fitted into the first support and second coupling portions extending axially from outer circumferential portions of the second support; and a damper including outer support recesses provided in outer circumferential portions thereof, with the first coupling portions being fitted into the outer support recesses, and inner support recesses provided in inner circumferential portions thereof, with the second coupling portions being fitted into the inner support recesses, wherein the damper is coupled between the first connector and the second connector.

According to exemplary embodiments, the power transmission device of a steering system can transmit torque from a first shaft to a second shaft while reliably maintaining strength without vibrations or noise and absorb noise due to heat or impacts, as compared to power transmission devices of the related art.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
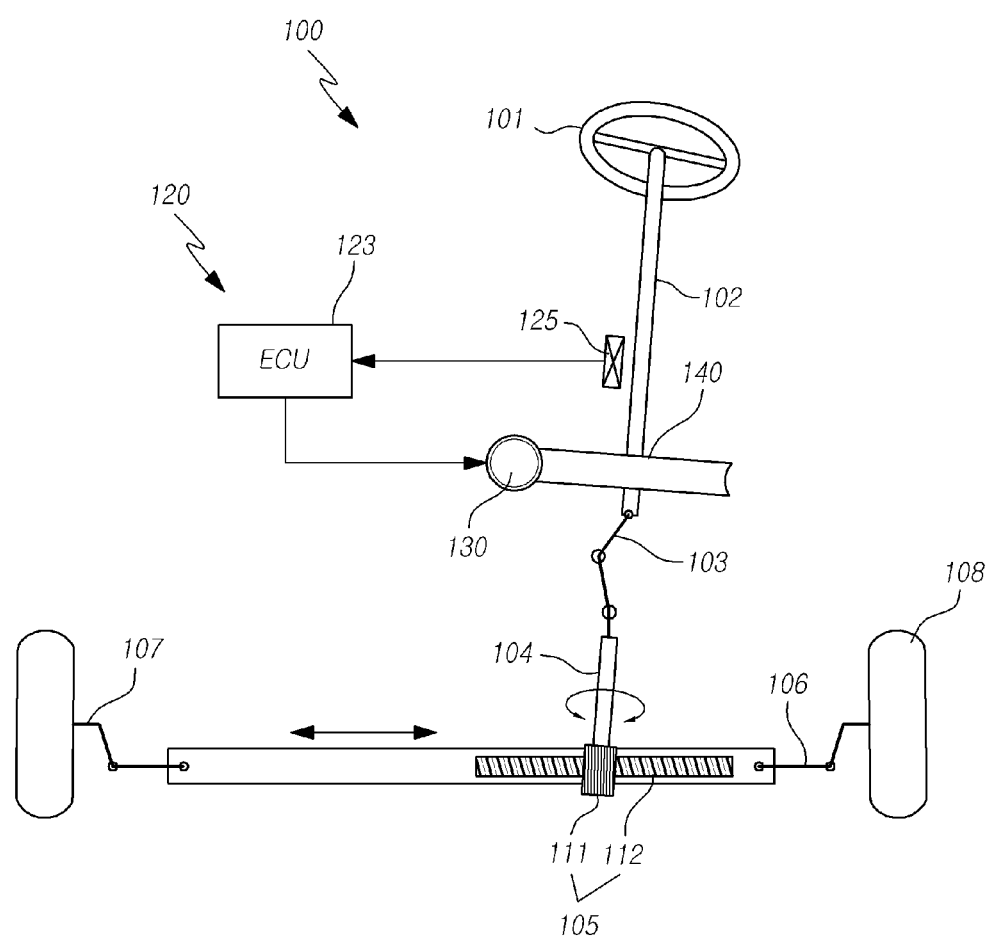
FIG. 1 is a schematic view illustrating a steering system according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 2:
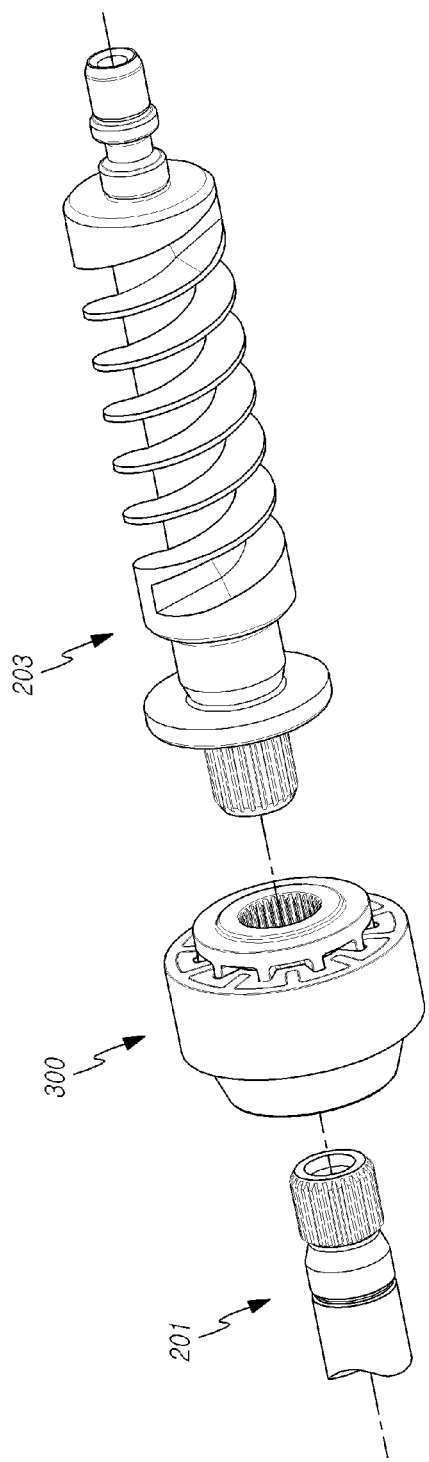
FIGS. 2 and 3 are exploded perspective views illustrating a power transmission device of the steering system according to embodiments.
Figure 3:
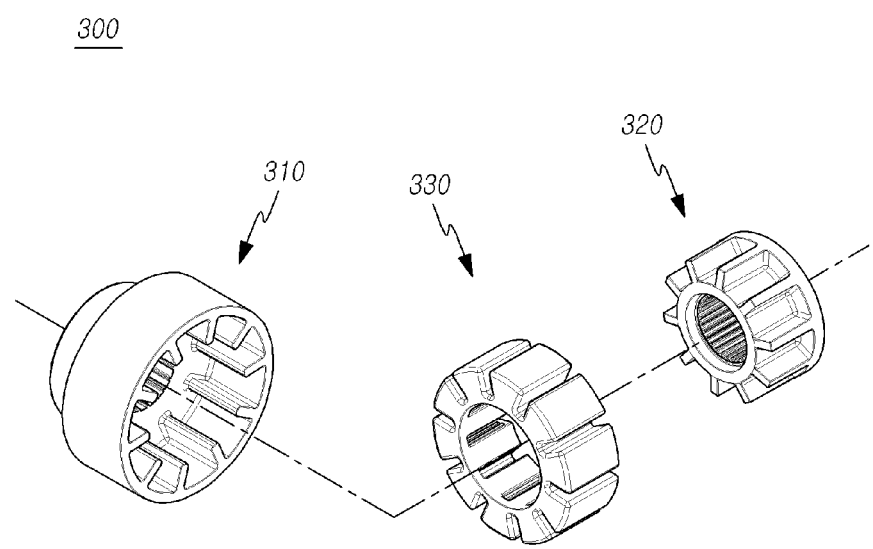
Figure 4:
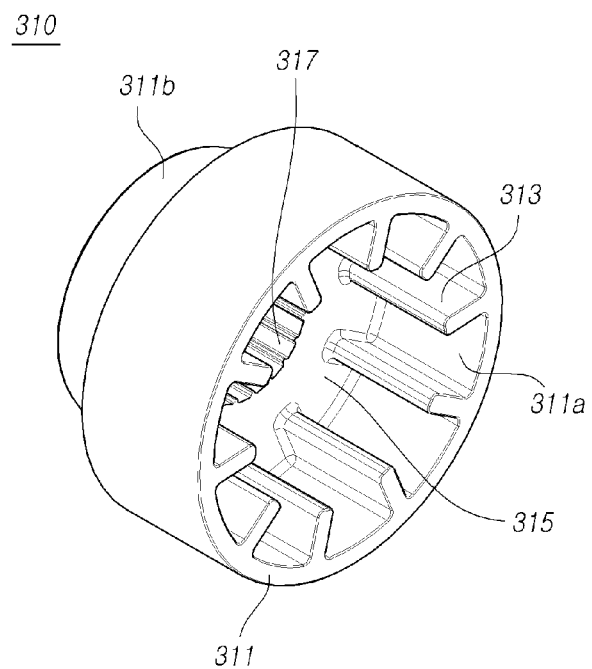
FIGS. 4 to 6 are perspective views illustrating components of the power transmission device of the steering system according to embodiments.
Figure 5:
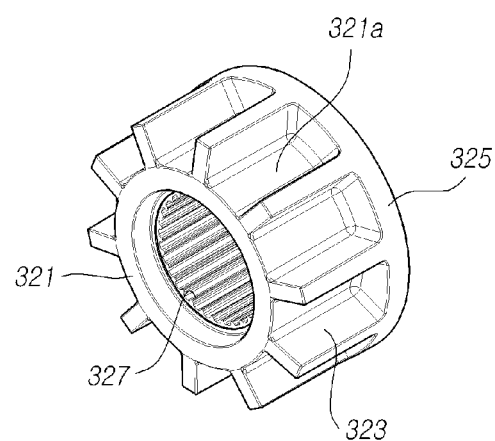
Figure 6:
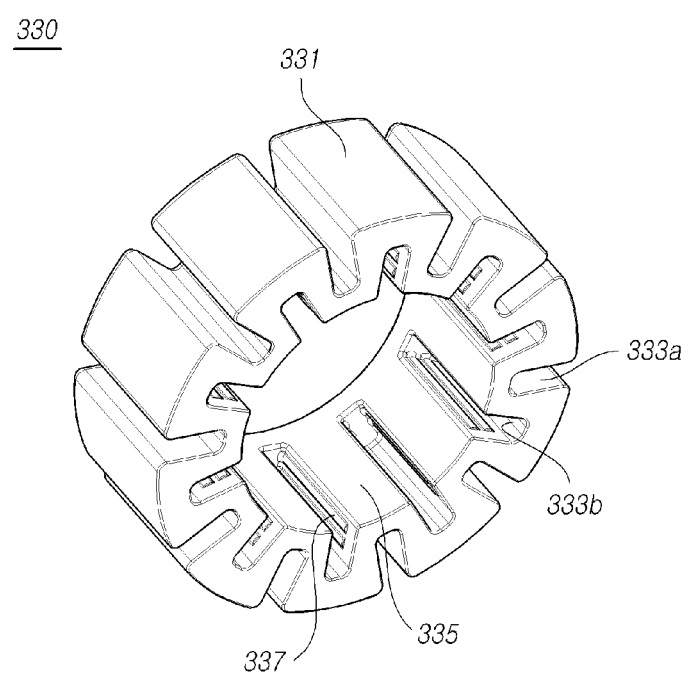
Figure 7:
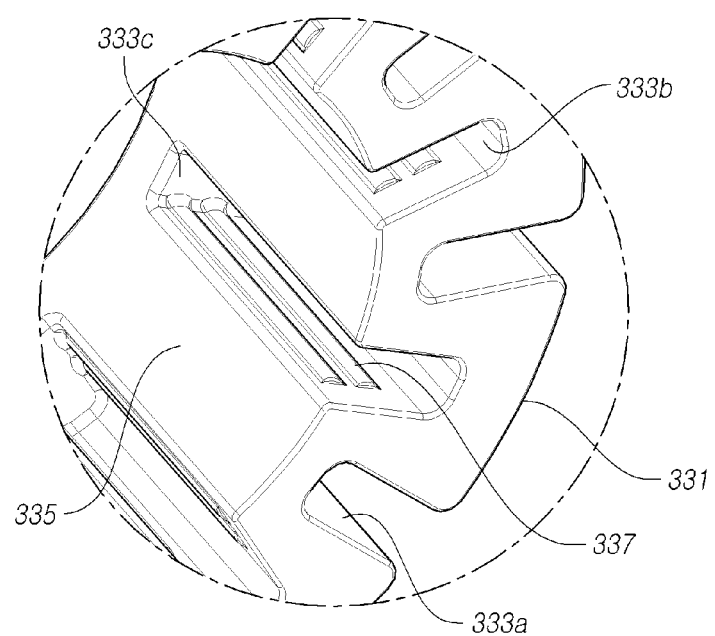
FIGS. 7 and 8 are partially-enlarged perspective views illustrating portions of the damper of the power transmission device of the steering system according to embodiments.
Figure 8:
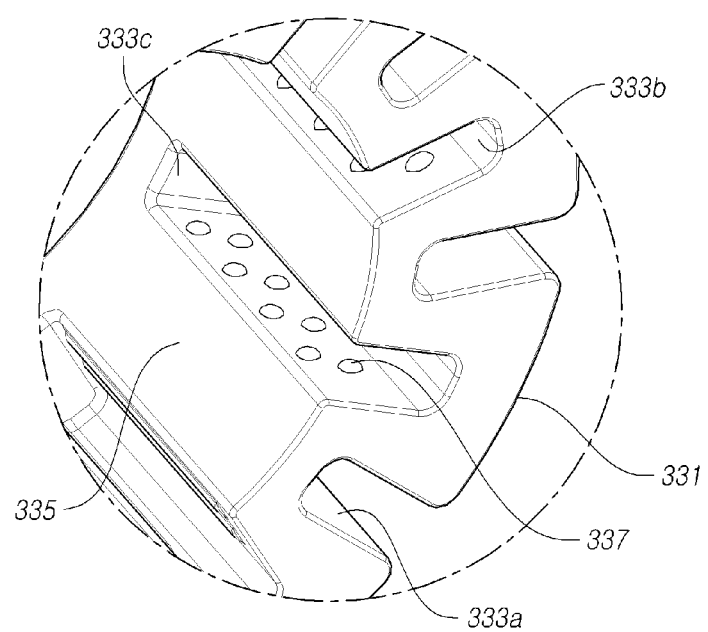
Figure 9:
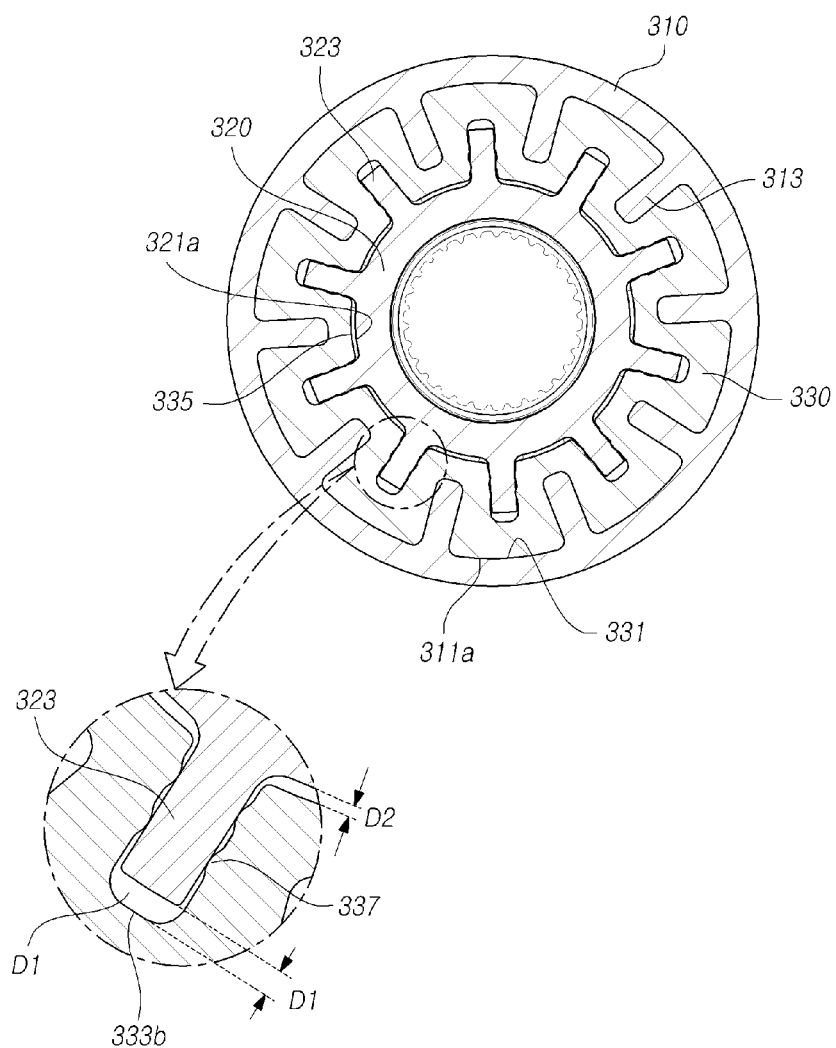
FIGS. 9 and 10 are cross-sectional views illustrating the power transmission device of the steering system according to embodiments.
Figure 10:
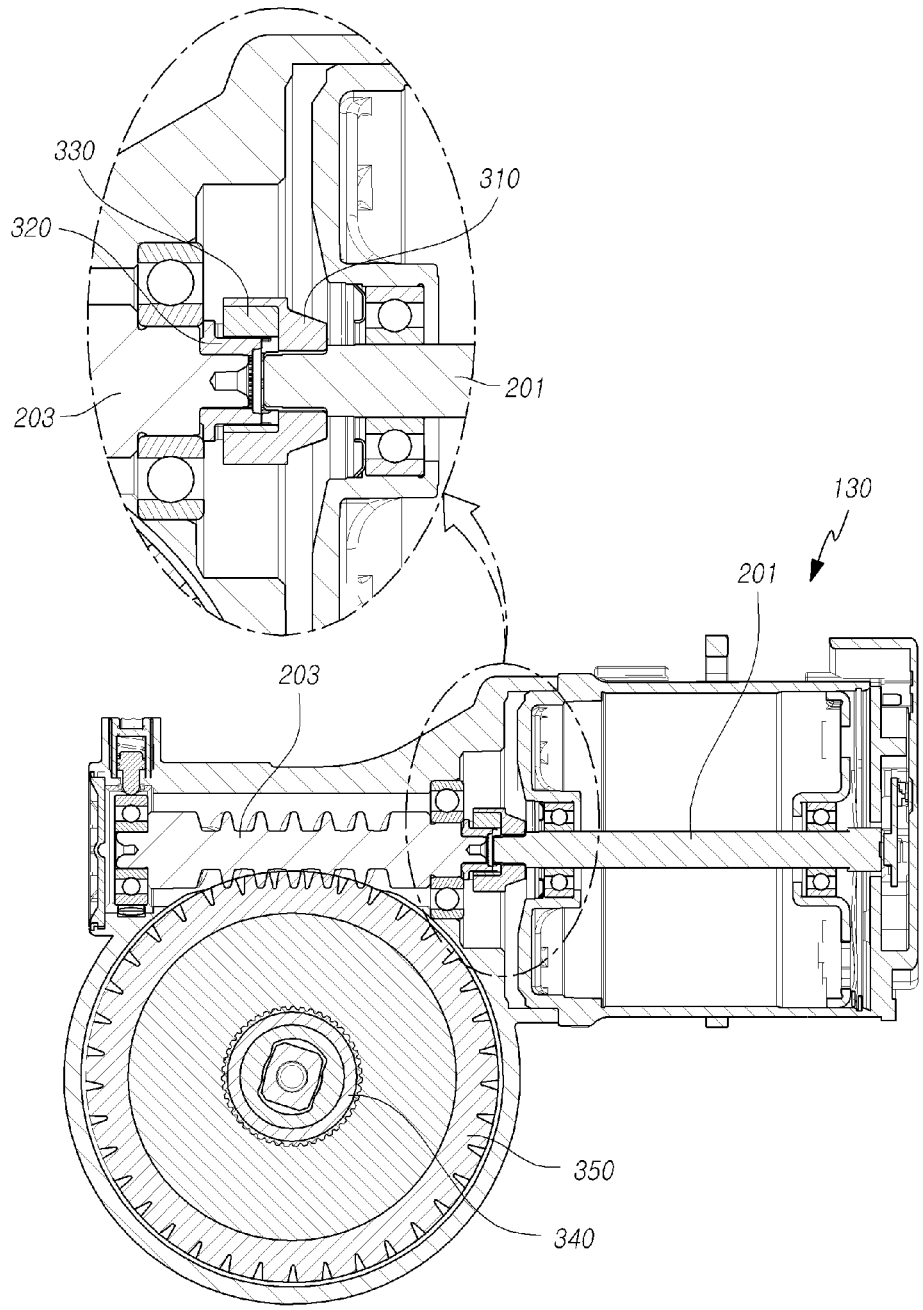

FIG. 1 is a schematic view illustrating a steering system according to embodiments, FIGS. 2 and 3 are exploded perspective views illustrating a power transmission device of the steering system according to embodiments, FIGS. 4 to 6 are perspective views illustrating components of the power transmission device of the steering system according to embodiments, FIGS. 7 and 8 are partially-enlarged perspective views illustrating portions of the damper of the power transmission device of the steering system according to embodiments, and FIGS. 9 and 10 are cross-sectional views illustrating the power transmission device of the steering system according to embodiments.

As illustrated in the drawings, the power transmission device 300 of the steering system according to embodiments includes a first connector 310, a second connector 320, and a damper 330. The first connector 310 includes a cylindrical first support 311 coupled to one of coaxial first and second shafts 201 and 203 and first coupling portions 313 extending axially from inner circumferential portions of the first support 311. The second connector 320 includes a second support 321 coupled to the other of the first and second shafts 201 and 203 and fitted into the first support 311 and second coupling portions 323 extending axially from outer circumferential portions of the second support 321. The damper 330 has outer support recesses 333a provided in outer circumferential portions, with the first coupling portions 313 being fitted into the outer support recesses 333a, and inner support recesses 333b provided in inner circumferential portions, with the second coupling portions 323 being fitted into the inner support recesses 333b, and is coupled between the first connector 310 and the second connector 320.

The power transmission device 300 is coaxially connected to the first shaft 201, which is connected to and rotated by a power source, such as a motor or a pump, to transmit torque from the power source to the second shaft 203. In the detailed description of embodiments, by way of example, the first shaft 201 will be described as a motor shaft of an electric power-assisted steering system, and the second shaft 203 will be described as a worm shaft of the electric power-assisted steering system.

In addition, the first connector 310 will be described as being coupled to the first shaft 201, while the second connector 320 will be described as being coupled to the second shaft 203.

For reference, in this case, the power transmission device 300 connects the motor shaft, by which assistance power of the electric power-assisted steering system is generated, to the worm shaft to transmit the assistance power, generated by the motor, to a steering shaft 340 coupled to a worm wheel 350. In this manner, the power transmission device 300 is used as a power transmission device to assist the steering force of a driver.

Here, the electric power-assisted steering system will be briefly described. As illustrated FIG. 1, the electric power-assisted steering system includes a steering assembly 100 including a plurality of components, extending from the steering wheel 101 to wheels 108 of a vehicle, and an assistance power device 120 providing steering assistance power to the steering assembly 100.

The steering assembly 100 includes a steering shaft 102, with one end portion thereof being connected to the steering wheel 101 to rotate along with the steering wheel 101, and the other end portion thereof being connected to a pinion shaft 104 via a pair of universal joints 103.

In addition, the pinion shaft 104 is connected to a rack bar via a rack-pinion gear unit 105, and both ends of the rack bar are connected to the wheels 108 of the vehicle via tie rods 106 and knuckle arms 107. The rack-pinion gear unit 105 is comprised of a pinion gear 111 provided on the pinion shaft 104 and a rack gear 112 provided on an outer circumferential portion of the rack bar, the pinion gear 111 and the rack gear 112 being engaged with each other. According to this configuration, when the driver manipulates the steering wheel 101, the steering assembly 100 generates torque, which in turn steers the wheels 108 via the rack-pinion gear unit 105 and the tie rods 106.

The assistance power device 120 includes a torque sensor 125 detecting torque that the driver applies to the steering wheel 101 and outputting an electrical signal proportional to the value of the detected torque, an electronic control unit 123 generating a control signal on the basis of the electrical signal applied from the torque sensor 125, a motor 130 generating assistance power on the basis of a signal applied from the electronic control unit 123, and a decelerator 140 transmitting the assistance power from the motor to the steering shaft 102.

As illustrated in FIGS. 2 to 10, in the power transmission device 300, the first connector 310 and the second connector 320 are coupled to the first shaft 201 and the second shaft 203, respectively, and the damper 330 is coupled between the first connector 310 and the second connector 320. With this configuration, the power transmission device 300 can coaxially connect the first and second shafts 201 and 203 to transmit power.

The first connector 310 has a first engagement hole 317 in the central portion, such that the first shaft 201 is fitted into the first engagement hole 317. The first coupling portions 313 are provided on the inner circumferential portions of the first support 311 protruding axially in the form of a cylinder.

A serration is provided axially on the inner circumferential portions of the first engagement hole 317 so as to be engaged with a corresponding serration of the first shaft 201, thereby preventing lost motion or skidding during rotation of the first shaft 201.

The plurality of first coupling portions 313, provided on the first support 311, are spaced apart from each other in the circumferential direction. The first coupling portions 313 protrude radially from the inner circumferential portions of the first support 311 toward the center of the first connector 310 so as to be fitted into the outer support recesses 333a of the damper 330.

The first connector 310 has an extension support 311b extending axially from one end of the first support 311, the diameter of the extension support 311b being smaller than that of the first support 311. The first engagement hole 317 is provided within the extension support 311b. The damper 330 can be fitted into a hollow space of the first support 311.

In addition, the first connector 310 has a support wall 315 provided in an inner portion of a stepped connecting portion between the extension support 311b and the first support 311 to support and axially fix one end portion of the damper 330. Accordingly, when the first connector 310 is coupled to the damper 330, one end portion of the damper 330 is supported and fixed by the support wall 315.

In addition, the first connector 310 is configured such that axial ends of the first coupling portions 313 are connected to the support wall 315. Accordingly, even when circumferential load is applied to the first coupling portions 313, the first coupling portions 313 can be supported by the support wall 315, thereby maintaining rigidity.

The second connector 320 has a second engagement hole 327 in the central portion, such that the second shaft 203 is fitted into the second engagement hole 327. The second coupling portions 323 protrude axially from the outer circumferential portions of the second support 321 protruding axially in the form of a cylinder.

The size of the second support 321 is smaller than the diameter of the first support 311. Accordingly, the first support 311 is coupled to the damper 330 while supporting the outer circumference of the damper 330, and the second support 321 is coupled to the damper 330 while supporting the inner circumference of the damper 330.

In addition, a serration is provided axially on the inner circumferential portions of the second engagement hole 327 so as to be engaged with a corresponding serration of the second shaft 203, thereby preventing lost motion or skidding during rotation of the second shaft 203.

In addition, the plurality of second coupling portions 323, provided in the second support 321, are spaced apart from each other in the circumferential direction, and protrude from outer circumferential portions of the second support 321. The second coupling portions 323 protrude radially from the central portion of the second connector 320 so as to be fitted into the inner support recesses 333b of the damper 330.

In addition, the second connector 320 has a support end portion 325 on the other end portion thereof facing away from the damper 330. When the first shaft 201 and the second shaft 203 move, the support end portion 325 supports and axially fixes the other end portion of the damper 330. When the second connector 320 is coupled to the damper 330, the other end portion of the damper 330 is spaced apart from the support end portion 325.

Accordingly, the damper 330 is axially coupled to second connector 320, with one end portion of the damper 330 being supported by the support wall 315 of the first connector 310, and the other end portion of the damper 330 being spaced apart from the support end portion 325 of the second connector 320. When the first shaft 201 and the second shaft 203 move, the support end portion 325 axially supports the damper 330.

In addition, the second connector 320 is configured such that the axial ends of the second coupling portions 323 are connected to the support end portion 325. Accordingly, even when circumferential load is applied, the second coupling portions 323 can be supported by the support end portion 325, thereby maintaining rigidity.

In the damper 330 coupled between the first connector 310 and the second connector 320, each of the inner support recesses 333b is configured such that one end thereof in the direction of the second connector is opened and the other end thereof in the direction of the first connector 310 is closed by an end surface 333c.

In addition, the second coupling portions 323 of the second connector 320 are fitted into the inner support recesses 333b, with the distal ends of the second coupling portions 323 being spaced apart from the end surfaces 333c of the inner support recesses 333b, so that the axial position is fixed.

In addition, in the damper 330, the plurality of outer support recesses 333a are spaced apart from each other in the circumferential direction, and a plurality of outer supports 331 alternate with the plurality of outer support recesses 333a, such that the plurality of outer supports 331 and the plurality of outer support recesses 333a are arranged in the circumferential direction.

In addition, in the damper 330, the plurality of inner support recesses 333b are spaced apart from each other in the circumferential direction, and a plurality of inner supports 335 alternate with the plurality of inner support recesses 333b, such that the plurality of inner supports 335 and the plurality of inner support recesses 333b are arranged in the circumferential direction.

That is, when the damper 330 is viewed in an axial direction, the outer supports 331 and the inner supports 335 are disposed alternately in the circumferential direction in a staggered manner. Thus, the outer support recesses 333a and the inner support recesses 333b are also disposed alternately in the circumferential direction in a staggered manner. Accordingly, when the first shaft 201 and the second shaft 203 rotate, supporting force in the circumferential direction can be uniformly distributed.

The first connector 310 and the second connector 320 may be made of a metal, such as steel, or an engineering plastic, such as polyoxymethylene (POM), polyamide (PA), polycarbonate (PC), polyimide (PI), or polybutylene terephthalate (PBT).

In addition, the damper 330 may be made of a material having weatherability, flexibility, and elasticity, such as natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, or silicone.

In addition, each of the inner support recesses 333b of the damper 330 has support protrusions 337 protruding from an inner surface thereof. The support protrusions 337 elastically support the second coupling portions 323.

The support protrusions 337 may be provided on at least one of circumferentially-facing surfaces of each of the inner support recesses 333b. In the drawings of the present disclosure, the support protrusions 337 are illustrated as being provided on both the circumferentially-facing surfaces of each of the inner support recesses 333b.

As illustrated in FIGS. 6 and 7, the support protrusions 337 may be in the shape of pillars extending in the axial direction. In this case, two or more support protrusions 337 may be provided on each of the circumferentially-facing surfaces so as to be spaced apart from each other in the radial direction.

In addition, as illustrated in FIG. 8, the support protrusions 337 may be in the shape of convex portions, i.e. embossed structures respectively having a dome-shaped outer surface. In this case, the support protrusions 337 may be provided as a plurality of support protrusions that are spaced apart from each other in the axial direction while being arrayed in two or more rows spaced apart from each other in the radial direction.

The support protrusions 337 are elastically compressed when the second coupling portions 323 are fitted into the inner support recesses 333b. As illustrated in FIG. 9, in a position in which the second coupling portions 323 are completely fitted into the inner support recesses 333b, the support protrusions 337 are in contact with and support the second coupling portions 323, and the surfaces of the inner supports 335 are spaced apart from the second coupling portions 323.

Accordingly, it is possible to reduce torsional load occurring in a portion of the damper 330, into which the second coupling portions 323 is inserted, when the second connector 320 rotates. In addition, it is possible to prevent the portion of the damper 330, into which the second coupling portions 323 is inserted, from being deformed or losing durability in a high temperature environment.

In addition, as illustrated in FIG. 9, inner circumferential surfaces 311a of the first support 311 are in contact and engaged with the outer supports 331, such that a space D1 is defined between an inner end of each of the inner support recesses 333b and a distal end of the corresponding one of the second coupling portions 323, and a hollow space D2 is defined between each of outer circumferential surfaces 321a of the second support 321 and a corresponding one of the inner supports 335.

Accordingly, in a high temperature environment, thermal expansion of the damper 330 may occur radially toward the center, so as to be absorbed by the spaces D1 and the spaces D2. It is possible to reliably maintain rigidity without vibrations or noise and absorb noise caused by heat or impacts while transmitting torque from the first shaft 201 to the second shaft 203.

According to embodiments having the above described structure and shape, it is possible to transmit torque from a first shaft to a second shaft while reliably maintaining strength without vibrations or noise and to absorb noise due to heat or impacts, as compared to power transmission devices of the related art.

Although all of the components of the foregoing embodiments of the present disclosure may have been explained as combined or operatively connected as a unit, the present disclosure is not intended to be limited to the embodiments shown. Rather, the respective components may be selectively and operatively combined in any numbers without departing from the scope of the present disclosure.

It will be understood that the terms "comprise," "include," "have," and any variations thereof used herein are intended to cover non-exclusive inclusions unless explicitly described to the contrary. Unless otherwise specified, all terms including technical and scientific terms used herein have the same meaning as commonly understood by those having ordinary knowledge in the technical field to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A power transmission device of a steering system, comprising:
    a first connector comprising a cylindrical first support coupled to one of coaxial first and second shafts and first coupling portions extending axially from inner circumferential portions of the first support;
    a second connector comprising a second support coupled to the other of the first and second shafts and fitted into the first support and second coupling portions extending axially from outer circumferential portions of the second support; and
    a damper comprising outer support recesses provided in outer circumferential portions thereof, with the first coupling portions being fitted into the outer support recesses, and inner support recesses provided in inner circumferential portions thereof, with the second coupling portions being fitted into the inner support recesses, wherein the damper is coupled between the first connector and the second connector,
    wherein the second connector has a support end portion provided on one end portion thereof facing away from the damper, the support end portion being spaced apart from one end portion of the damper in a position in which the damper is axially coupled to the second connector, and supporting the damper when the first shaft and the second shaft move.

2. The power transmission device according to claim 1, wherein the first connector has a first engagement hole provided in a central portion thereof, such that one of the first shaft and the second shaft is fitted into the first engagement hole, and a serration is provided axially on inner circumferential portions of the first engagement hole.

3. The power transmission device according to claim 1, wherein the first coupling portions comprise a plurality of first coupling portions protruding radially from the inner circumferential portions of the first support and being spaced apart from each other in a circumferential direction.

4. The power transmission device according to claim 1, wherein the first connector has an extension support extending axially from one end of the first support, the diameter of the extension support being smaller than that of the first support, and first engagement hole is provided within the extension support.

5. The power transmission device according to claim 4, wherein the first connector has a support wall provided in an inner portion of a stepped connecting portion between the extension support and the first support to support and axially fix one end portion of the damper.

6. The power transmission device according to claim 5, wherein the first connector is configured such that axial ends of the first coupling portions are connected to the support wall.

7. The power transmission device according to claim 1, wherein the second connector has a second engagement hole provided in a central portion thereof, such that one of the first shaft and the second shaft is fitted into the second engagement hole, and a serration is provided axially on inner circumferential portions of the second engagement hole.

8. The power transmission device according to claim 1, wherein the second coupling portions comprise a plurality of second coupling portions protruding radially from outer circumferential portions of the second support and being spaced apart from each other in a circumferential direction.

9. The power transmission device according to claim 1, wherein the second connector is configured such that axial ends of the second coupling portions are connected to the support end portion.

10. The power transmission device according to claim 1, wherein each of the inner support recesses of the damper is configured such that one end thereof in a direction of the second connector is opened and the other end thereof in a direction of the first connector is closed.

11. The power transmission device according to claim 10, wherein the outer support recesses of the damper comprise a plurality of outer support recesses spaced apart from each other in a circumferential direction, and the damper further comprises a plurality of outer supports alternating with the plurality of outer support recesses.

12. The power transmission device according to claim 11, wherein the inner support recesses of the damper comprise a plurality of inner support recesses spaced apart from each other in the circumferential direction, and the damper further comprises a plurality of inner supports alternating with the plurality of inner support recesses.

13. The power transmission device according to claim 12, wherein the outer support recesses of the damper alternate with the inner support recesses of the damper in the circumferential direction.

14. The power transmission device according to claim 13, wherein each of the inner support recesses of the damper has a support protrusion protruding from an inner surface thereof.

15. The power transmission device according to claim 14, wherein the support protrusion is provided on at least one of circumferentially-facing surfaces of each of the inner support recesses.

16. The power transmission device according to claim 15, wherein the support protrusions has a shape of a pillar extending in an axial direction.

17. The power transmission device according to claim 16, wherein the support protrusion comprises two or more support protrusions spaced apart from each other in a radial direction.

18. The power transmission device according to claim 15, wherein each of the support protrusions has a shape of a convex portion.

19. The power transmission device according to claim 18, wherein the support protrusion comprises a plurality of support protrusions spaced apart from each other in an axial direction, the a plurality of support protrusions being arrayed in two or more rows spaced apart from each other in the radial direction.

* * * * *